United States Patent [19]

Nagahara

[11] 4,299,475
[45] Nov. 10, 1981

[54] SCANNING METHOD AND APPARATUS APPLICABLE TO VARIABLE MAGNIFICATION COPYING MACHINES

[75] Inventor: Yasumori Nagahara, Yokosuka, Japan

[73] Assignee: Ricoh Company, Ltd., Tokyo, Japan

[21] Appl. No.: 129,679

[22] Filed: Mar. 12, 1980

[30] Foreign Application Priority Data

Mar. 19, 1979 [JP] Japan .................................. 54-32078

[51] Int. Cl.³ .......................................... G03G 15/28
[52] U.S. Cl. ........................................ 355/8; 355/55; 355/77
[58] Field of Search .................... 355/8, 55, 57, 60, 77

[56] References Cited

U.S. PATENT DOCUMENTS

| | | | |
|---|---|---|---|
| 3,614,222 | 10/1971 | Post et al. | 355/60 X |
| 4,032,231 | 6/1977 | Zucker | 355/60 |
| 4,080,062 | 3/1978 | Torigai et al. | 355/57 X |
| 4,093,374 | 6/1978 | Zucker et al. | 355/57 |
| 4,095,880 | 6/1978 | Shogren | 355/57 X |
| 4,118,118 | 10/1978 | Barto | 355/57 X |
| 4,120,578 | 10/1978 | Daniels et al. | 355/57 X |
| 4,129,377 | 12/1978 | Miyamoto et al. | 355/55 X |
| 4,139,298 | 2/1979 | Tani | 355/60 X |
| 4,158,497 | 6/1979 | Suzuki et al. | 355/57 X |
| 4,211,482 | 7/1980 | Arai et al. | 355/60 X |

Primary Examiner—Richard L. Moses
Attorney, Agent, or Firm—Wyatt, Gerber, Shoup, Scobey & Badie

[57] ABSTRACT

In a variable magnification copying machines capable of performing slit exposure of the image of original document to the surface of a photoconductor with a desired magnification by moving a contact glass on which the original document is placed or an optical system in synchronization with the photoconductor which is moved at a predetermined constant speed, a scanning method and apparatus in which the moving speed of the optical system or of the contact glass at the exposure step and the moving speed of the same at the returning step to the original position thereof are made variable depending upon a selected magnification of the copy of the original document, and the moving speed of the optical system or of the contact glass is set in such a manner that the sum of the time required for the optical system or the contact glass to move for exposure scanning and the time required for the optical system or the contact glass to return to the home position thereof is constant regardless of the selected magnification of the copy of the original document.

4 Claims, 7 Drawing Figures

SCANNING METHOD AND APPARATUS APPLICABLE TO VARIABLE MAGNIFICATION COPYING MACHINES

BACKGROUND OF THE INVENTION

The present invention relates to a scanning method and apparatus applicable to variable magnification copying machines.

Recently, a marked tendency to increase the copying speed of electrophotographic copying machines and to provide them with various additional functions is seen. One of the additional functions is to vary the magnification of copy size by enlarging or reducing copy size. In particular, it is a more general tendency to provide electrophotographic copying machines with a function of reducing copy size.

Therefore, the conventional copy size reduction systems will be explained first for a better understanding of the invention.

The conventional copy size reduction systems can be roughly classified into the following four types: (1) Overall exposure reduction system, (2) Slit exposure reduction system of original document movable type which is applicable to sheet originals, (3) Slit exposure reduction system of original document platen movable type, and (4) Slit exposure reduction system of original document stationary type.

Of the above-mentioned four types of copy size reduction systems, the slit exposure reduction system of original document stationary type (4) is as good as the overall exposure system (1) in the point that the quality of copies largely not effected by the kind and weight of original document to be copied. Additionally, the slit exposure reduction system (4) is excellent in that the system is not to be oversized unlike the overall exposure reduction system (1), but it requires that the moving speed of the optical system and the illumination system (hereinafter collectively referred to as the optical system) have to be varied depending upon a selected copy magnification. Generally, the moving speed of the photoconductor is constant regardless of the copy magnification. Therefore, when the moving speed of the optical system at unit magnification, which is also identical to the moving speed of the photoconductor, is $V_F$, and a selected magnification is m (m<1 at reduction copy size), the moving speed of the optical system at the exposure step, $v_F$, is determined by $$v_F = (1/m)V_F \quad (1)$$

Taking into consideration that the moving speed of the optical system at the exposure step has to be varied depending upon a selected magnification, a copying machine employing the slit exposure reduction system of original document stationary type will now be discussed a little further. In this type of copying machine, generally more copies are made with unit magnifications than with other magnification and in order to maximize the number of copies per unit time with unit magnification, with respect to the moving speed of the optical system during exposure, a limit design has to be made on the basis of the moving speed of the optical system at unit magnification. However, at the time of reduction of copy, the moving speed of the optical system at the exposure step has to be set greater than that at unit magnification. This is, however, difficult in view of the life of the lamps in the illumination system and noise and other limitations so that the increase of copy speed and improvement of variable magnification function are difficult to attain at the same time.

Practically, the moving speed of the optical system during exposure step at unit magnification is determined by taking into consideration the moving speed of the optical system at reduction of copy size, so that the copy speed at unit magnification which is originally possible to be increased is sacrificed.

In the slit exposure reduction system of original document platen movable type (3), the moving speed of the original document platen during exposure at the time of copy reduction has to be increased in comparison with the moving speed of the original document platen at unit magnification for the same reason as mentioned above. Therefore, there may be a risk that the original document, in particular, a book type original document is maybe shifted from its original position on the original platen by the change of the speed of the original document platen during the exposure step and its return step so that the copy image is shifted. Therefore, the slit exposure reduction system (3) is not always suitable for high speed copying and also has problems similar to those of the slit exposure reduction system (4).

SUMMARY OF THE INVENTION

It is an object of the invention to provide a scanning method and apparatus applicable to variable magnification copying machines, which eliminates the shortcomings of the conventional scanning methods and apparatuses for variable magnification copying machines.

According to the invention, in a variable magnification copying machine capable of performing slit exposure of the image of original document to the surface of a photoconductor with a desired magnification by moving a contact glass on which the original document is placed or an optical system in synchronization with the photoconductor which is moved at a predetermined constant speed, the moving speed of the optical system or of the contact glass at the exposure step and the moving speed of the same at the returning step to the original position thereof are made variable depending upon a selected magnification of the copy of the original document, and the moving speed of the optical system or of the contact glass is set in such a manner that the sum of the time required for the optical system or the contact glass to move for exposure scanning and the time required for the optical system or the contact glass to return to the home position thereof is constant regardless of the selected magnification of the copy of the original document.

DESCRIPTION OF THE PREFERRED EMBODIMENT

Figure 1:
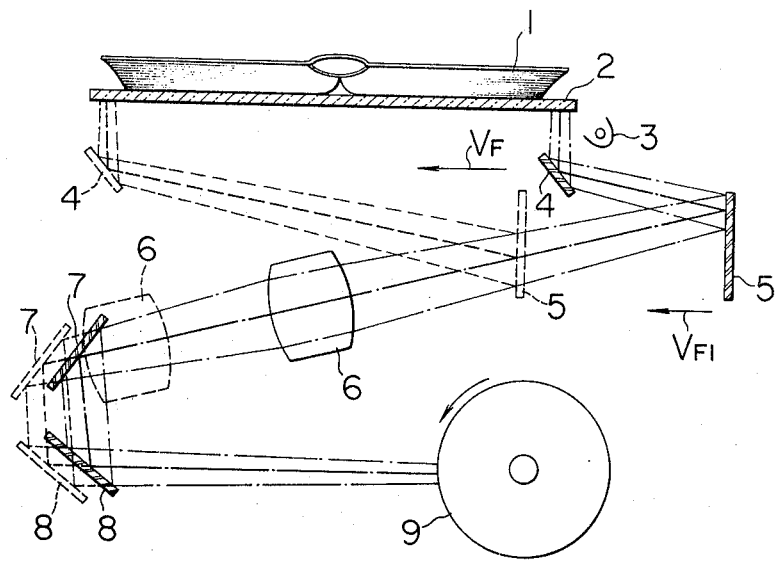
FIG. 1 shows diagrammatically a slit exposure reduction system of the original document sationary type to which the invention is applicable.

Referring to FIG. 1, there is shown a slit exposure reduction system of original document stationary type to which the invention is applicable. In FIG. 1, reference numeral 1 represents an original document, numeral 2 a transparent original document platen (hereinafter referred to as contact glass), numeral 3 an exposure lamp, numeral 4 a first mirror, numeral 5 a second mirror, numeral 6 a lens, numerals 7 and 8 mirrors, and numeral 9 a photoconductor drum. Supposing that the lens 6 and the mirrors 7, 8 are positioned at the positions indicated by the solid lines at unit magnification, they are moved in advance to the positions indicated by the short dash lines when reduction copying is performed, in accordance with the principle of variable magnification so that exposure is performed.

In this type of slit exposure reduction system, the contact glass 2 is set stationarily at the exposure step, the exposure lamp 3 and the first mirror 4 are integrally moved in the forward direction as indicated by the arrow, the second mirror 5 is also moved in the forward direction as indicated by the arrow, and they are moved in the backward direction, whereby exposure is completed. In the meantime, the photoconductor drum 9 is rotated at a constant speed and a latent electrostatic image is formed on the surface of the photoconductor drum 9 by the above-mentioned exposure. Supposing that the peripheral rotation speed of the photoconductor drum 9 is $V_F$, $V_F$ is always set at a constant value regardless of the magnification m of the image of an original document formed on the photoconductor drum 9. Supposing that the movement speed of the first mirror 4 and the exposure lamp 3 during the exposure step is $v_F$, $v_F$ is indicated by $v_F=(1/m)V_F$ and the moving speed of the second mirror 5, $v_{F1}$, is in the relationship of $v_{F1}=(1/2m)V_F$.

As mentioned above, $v_F$ is the moving speed of the first mirror 4 and the exposure lamp 3 during the exposure step. When the backward moving speed of the optical system, namely the moving speed of the optical system when it returns, is $v_B$, $v_B$ is typically set a constant value regardless of any change of the magnification m.

The invention has been made from the abovementioned point of view. More specifically, in the invention, the speed $v_B$ is set so as to be changeable in accordance with the change of the magnification m.

Conventionally, since the moving speed at the returning step $v_B$ is always constant and the moving speed $v_F$ during the exposure step at the reduction of copy is set on the basis of the speed at unit magnification, the difference between the speed during the exposure step and that during the return step becomes so great that there is a risk that the original document 1 slips on the contact glass 2 in the previously mentioned exposure reduction system of original document platen movable type (3) and that some problems may occur with respect to the life of the exposure lamp and the generation of noise in the slit exposure reduction system of original document stationary type (4).

The basic technical idea of the invention is that when the moving speed of the optical system (the first mirror 4 and the exposure lamp 3) $v_F$ is increased corresponding to a selected copy reduction, the optical system is returned at a speed $v_B$ with a delay compensating the increase of the moving speed of the optical system during the exposure step and, when the speed of the optical system $v_F$ is decreased corresponding to a selected magnification, the returning speed $v_B$ is increased so as to compensate for the decrease of $v_F$, so that the sum of the time required for the optical system to be moved during the exposure step and the time required for the optical system to return to its home position is always set constant regardless of the change of the magnification m. In the copying machine of the type having a movable contact glass, the moving speed of the contact glass during the exposure step is $v_F$ while its returning speed is $v_B$.

According to the invention, even if a limit design of the optical system is made on the basis of unit magnification, the returning speed $v_B$ of the optical system or of the contact glass is decreased during reduction of copy image. Therefore, even if the exposure speed has to be increased at reduction of copy image, excess load is not applied to the copying machine, and the number of copies to be made can be set at a predetermined number regardless of its magnification, reduction or other magnification of copy image.

Figure 2:
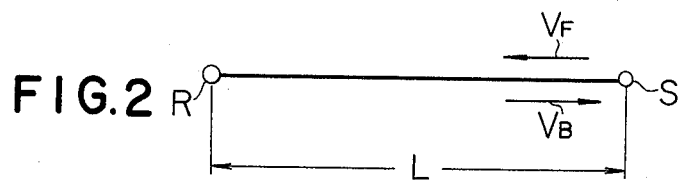
FIG. 2 shows diagrammatically the operation of a first mirror at the exposure step of the slit exposure reduction system of FIG. 1.

The invention will now be explained from the other angle using some equations. Referring to FIG. 2, symbol S represents the starting point for exposure of an optical system, for example, of the first mirror in FIG. 1. At the exposure step, the first mirror 2 is moved at the speed of $v_F$(mm/sec) and performs exposure while scanning an original document during the movement and reaches a returning point R and changes its movement direction at the returning point R and returns to its starting point at the speed of $v_B$. Supposing that the distance between the starting point S and the returning point R is L (mm), a regular time loss of the first mirror 4 during the movement is given by the following equation:

$$\frac{L}{v_F} + \frac{L}{v_B} + \delta T = \frac{60}{N} \quad (2)$$

where $\delta T$ is the time required for switching a clutch at the time of returning of the first mirror 4, N is the number of copies per minute, and m is the magnification.

In Equation (2), the distance L (mm) is the sum of the length l (mm) of original, and the slit exposure width W (mm) and the approach run length Tr (mm) of the slit up to the original exposure position.

From $v_F=(1/m)V_F$ (equation 1), equation 2 can be rewritten as follows:

$$\frac{mL}{V_F} + \frac{L}{v_B} + \delta T = \frac{60}{N} \quad (3)$$

where $V_F$ is the moving speed of the photoconductor and also the moving speed of the optical system or the contact glass during the exposure step at unit magnification.

Generally, copies are made more frequently at unit magnification, and therefore, it is preferable that the copying machine be designed such that the maximum number of copies can be obtained at unit magnification. When designed so, as can be seen from Equation (3), the number of copies N that can be obtained per minute at image reduction (m<1) is increased while the number of copies N obtained at image enlargement (m>1) is decreased in comparison with the number of copies obtained at unit magnification (m=1).

On the other hand, as mentioned previously, in order not to apply excess load to the copying machine, since the speed variation at the exposure step and at the return of the optical system has to be minimized, if the moving speed $v_B$ at the returning step is constant as in the conventional optical system, the moving speed $v_F$ of the optical system at the exposure step has to be increased. When the optical system is designed, giving priority to the speed change ratio of the optical system at image reduction, the moving speed $v_F$ of the optical system during the exposure step at unit magnification is automatically set at a low value, and accordingly the copying performance at unit magnification is lowered. It follows that the copying performance at the most frequently used unit magnification is sacrificed due to the image reduction function. Such an inconvenience could be eliminated by making the moving speed $v_B$ of the optical system at the returning step variable depending upon magnification m and corresponding to the moving speed $v_F$ of the optical system during the exposure step and thus making the speed change ratio constant. Supposing that the number of copies N to be made per unit minute is set constant regardless of the change of the magnification m, Equation (3) can be rewritten as follows by replacing $(60/N)-\delta T$ by K $(60/N-\delta T=K)$ and setting L·K at a constant value (L·K=constant):

$$\frac{mL}{V_F} + \frac{L}{v_B} = K \quad (4)$$

Equation (4) can be further rewritten as follows:

$$v_B = \frac{L}{\left(K - \frac{mL}{V_F}\right)} \quad (5)$$

Equation (5) signifies that, supposing that the above defined K and L are constant and accordingly $V_F$ is always constant, the moving speed at the exposure step at image reduction is greater than that at unit magnification, while the returning speed of the optical system at image reduction is smaller than that at unit magnification and that the moving speed of the optical system at the exposure step at image enlargement is smaller than that at unit magnification, while the returning speed of the optical system at image enlargement is greater than that at unit magnification. When the optical system is designed so as to satisfy Equation (5), the number of copies at image reduction to which the maximum copying performance is given in the conventional technique can be obtained as it is at unit magnification.

Figure 3:
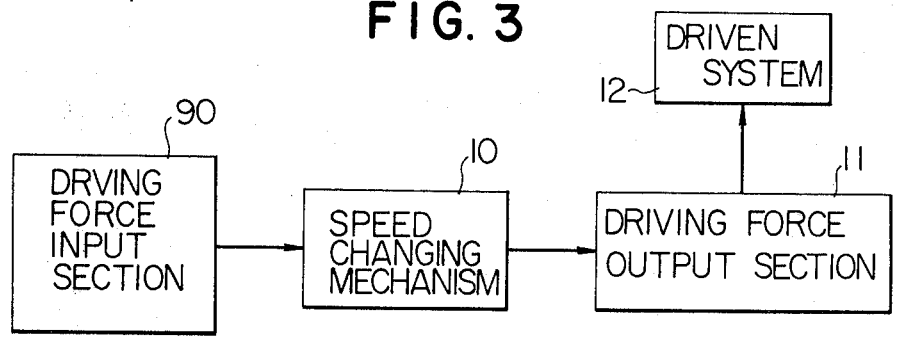
FIG. 3 is a block diagram of the construction of a driving system and a driven system of a copying machine according to the invention.

The invention can be applied to variable magnification copying machines by disposing a suitable speed changing mechanism in the optical system or in the drive system for the contact glass so that the optical system or the drive system is controlled by the speed changing mechanism so as to obtain the returning speed which satisfies Equation (5). This relationship will now be explained by referring to FIG. 3. In FIG. 3, numeral 90 represents an input section which outputs driving force which drives the photoconductor drum 9 and other pertaining members at a constant number of revolutions, and numeral 10 the above-mentioned speed changing mechanism according to the invention, and numeral 11 a driving force output section which converts the rotation obtained by the speed changing mechanism 10 to a linear reciprocal movement and transmits the same to a driven system 12. The driven system 12 signifies the optical system in the slit exposure reduction system of original document stationary type or the original platen in the slit exposure reduction system of original document platen movable type. The speed changing mechanism 10 has a function of transmitting the rotating force at a predetermined speed obtained from the driving force input section 90 to the driving force output section 11 at a predetermined speed changing ratio and in a predetermined rotating direction, each of which satisfies Equations (1) and (5). The speed changing mechanism 10 comprises gears and clutches in combination. Alternatively, the driving force input section 9 and the speed changing mechanism 10 can be replaced by a speed changeable motor which satisfies the output condition with respect to the driving force output section 11.

An example of the speed changing mechanism 10 will now be explained. Usually, a variable magnification mechanism for use with office copying machine is provided with an image reduction function, and the most frequently employed image reduction ratios are the reduction ratio for converting A3 size to A4 size, which is 1:½ (magnification $m=1/\sqrt{2}$) in the area ratio and the reduction ratio for converting B4 size to A4 size, which is 1:1.5 (magnification $m=1/\sqrt{1.5}$) in the area ratio. Therefore, a speed changing mechanism capable of obtaining the above-mentioned reduction ratios will now be explained.

Figure 4:
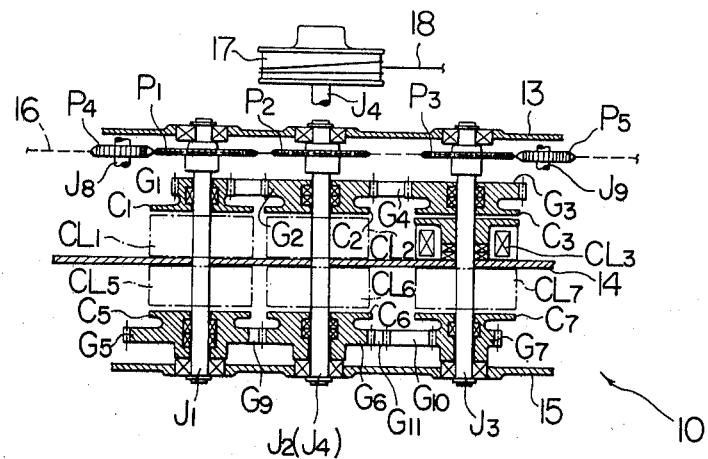
FIG. 4 is a cross section of a speed changing mechanism of an embodiment of the invention.
Figure 5:
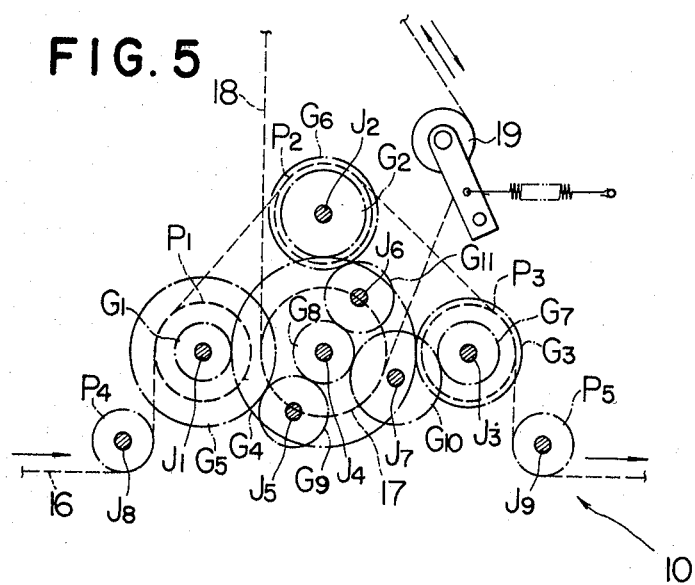
FIG. 5 shows diagrammatically the engagement of each of the gears of the speed changing mechanism applicable to the invention.

Referring to FIGS. 4 and 5, symbols $J_1$ to $J_9$ represents shafts, which are supported by frames 13, 14 and 15 and other members. To the shafts $J_1$, $J_2$, $J_3$, there are attached respectively sprockets $P_1$, $P_2$, $P_3$ substantially integrally with the shafts $J_1$, $J_2$, $J_3$. The diameters of the sprockets $P_1$, $P_2$, $P_3$ are equal. A chain 16 is trained over the sprockets $P_1$, $P_2$, $P_3$. By the movement of the chain 16, the sprockets $P_1$, $P_2$, $P_3$ and the shafts $J_1$, $J_2$, $J_3$ are rotated in the same direction and at the same speed. Sprockets $P_4$, $P_5$ which are rotatably attached to the shafts $J_8$, $J_9$ are disposed as guide members for training the chain 16.

Figure 6:
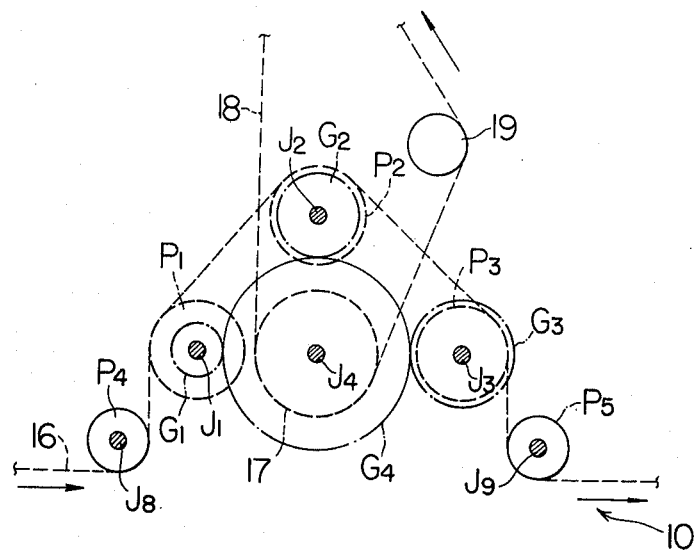
FIG. 6 shows the transmission path of the driving force in an optical system at the exposure step in one embodiment of a scanning apparatus of the invention.

A gear $G_1$ through which shaft $J_1$ is passed is attached integrally to a clutch plate $C_1$ and is rotatable on the shaft $J_1$. Likewise gears $G_2$, $G_3$ through which the shafts $J_2$, $J_3$ are respectively passed are attached integrally to clutch plates $C_2$, $C_3$ and are respectively rotatable on the shafts $J_2$, $J_3$. The clutch plates $C_1$, $C_2$, $C_3$ are respectively disposed adjacent clutches $CL_1$, $CL_2$, $CL_3$ so as to face the clutches which are integral with shafts $J_1$, $J_2$, $J_3$ respectively. Normally, the clutch plates $C_1$, $C_2$, $C_3$ are separated from the clutches $CL_1$, $CL_2$, $CL_3$. However, in the condition of engaging the clutches, the clutch plates $C_1$, $C_2$, $C_3$ become integral with the counterpart clutches $CL_1$, $CL_2$, $CL_3$. For example, when the clutch $CL_1$ is actuated, the gear $G_1$ becomes integral with the clutch $CL_1$ by the action of an electromagnet so that the gear $G_1$ is rotated together with the shaft $J_1$. This relationship applies likewise to the gears $G_2$, $G_3$. To be more specific, when the clutch $CL_2$ is actuated, the gear $G_2$ is rotated integrally with the shaft $J_2$. When the clutch $CL_3$ is actuated, the gear $G_3$ becomes integral with the shaft $J_3$. The gears $G_1$, $G_2$, $G_3$ are engaged with a gear $G_4$ which is attached integrally to the shaft $J_4$. This relationship is illustrated in FIG. 6. A pulley 17 is attached integrally to the shaft $J_4$, and a wire 18 for driving the optical system is wound around the pulley 17. In FIG. 5, numeral 19 represents a guide roller of the wire 18. The above-mentioned gears $G_1$, $G_2$, $G_3$, $G_4$ and the clutch mechanism are used when a moving speed $v_F$ of the optical system at the exposure step is selected as will be explained in detail later.

A gear $G_5$ through which shaft $J_1$ is passed is attached integrally to a clutch plate $C_5$ and is rotatable on the shaft $J_1$. Likewise gears $G_6$, $G_7$ through which the shafts $J_2$, $J_3$ are respectively passed are attached integrally to clutch plates $C_6$, $C_7$ and are rotatable on the shafts $J_2$, $J_3$. The clutch plates $C_5$, $C_6$, $C_7$ are respectively disposed adjacent clutches $CL_5$, $CL_6$, $CL_7$ so as to face those clutches which are integral with the shafts $J_1$, $J_2$, $J_3$. Normally, the clutch plates $C_5$, $C_6$, $C_7$ are separated from the clutches $CL_5$, $CL_6$, $CL_7$. However, in the condition of engagement of the clutches, the clutches $C_5$, $C_6$, $C_7$ become integral with the respective counterpart clutches $CL_5$, $CL_6$, $CL_7$. For example, when the clutch $CL_5$ is actuated, the gear $G_5$ becomes integral with the clutch $CL_5$. Likewise when the clutch $CL_6$ is actuated, the gear $G_6$ becomes integral with the shaft $J_2$. When the clutch $CL_7$ is actuated, the gear $G_7$ becomes integral with the shaft $J_3$. A gear $G_8$ is attached integrally to the shaft $J_4$ to which the pulley 17 is attached.

Figure 7:
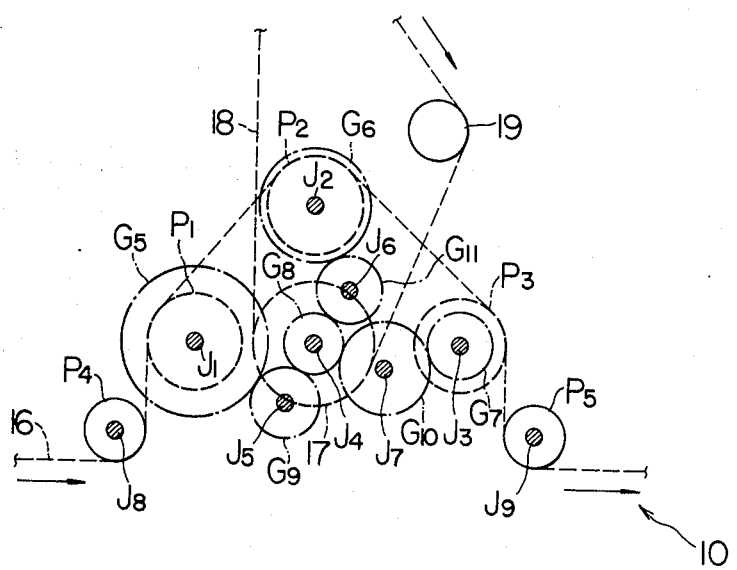
FIG. 7 shows the transmission path of the driving force at the returning step of the optical system of FIG. 6.

The gears $G_8$, $G_5$ are engaged with each other through an idle gear $G_9$ which is attached to the shaft $J_5$. The gears $G_8$, $G_7$ are engaged with each other by an idle gear $G_{10}$ which is attached to the shaft $J_7$. The gears $G_8$, $G_6$ are engaged with each other through an idle gear $G_{11}$ which is attached to the shaft $J_6$. These relationships are illustrated in FIG. 7.

In the speed changing mechanism 10, the shafts $J_1$, $J_2$, $J_3$ are always rotated at a predetermined constant speed by the chain 16. The shaft $J_4$ is rotated only when any of the clutches $CL_1$, $CL_2$, $CL_3$, $CL_4$, $CL_5$, $CL_6$ is actuated and transmits the rotation to the wire 18. When the chain 16 is moved at a constant speed from the left side to the right in FIG. 6, what force will be transmitted to the wire 18 will be explained. When any of the clutches $CL_1$, $CL_2$, $CL_3$ is actuated, the wire 18 is rotated counterclockwise as is shown in FIG. 6, while when any of the clutches $CL_5$, $CL_6$, $CL_7$ is actuated, the wire 18 is rotated clockwise. It is supposed that the optical system is scanning at the exposure step when the wire 18 is rotated counterclockwise, while the optical system is returning when the wire 18 is rotated clockwise.

The transmission path of the driving force when any of the clutches is actuated will now be explained taking into consideration the number of teeth of each gear.

(1) When the clutch $CL_1$ is actuated (FIG. 6): This is a case where exposure scanning is performed in order to obtain image with unit magnification ($m=1$) and the optical system is moved at the speed of $v_F=V_F$ at the exposure step, which is obtained by substituting $m=1$ in Equation (1). With respect to the transmission path of the driving force, the shaft $J_1$ is rotated by the chain 16 through the sprocket $P_1$. Since the clutch $CL_1$ is actuated, the gear $G_1$ is rotated and the gear $G_4$ which is engaged with the gear $G_1$ is also rotated, whereby the pulley 17 is rotated. The wire 18 is rotated counterclockwise. When the rotating speed of the shafts $J_1$, $J_2$, $J_3$ is $\eta$r.p.m. and the rotating speed of the pulley 17 is $N_{F1}$ r.p.m. when the optical system is at the exposure step, it is supposed that the exposure system is moved at the speed of $V_F$ (mm/sec). Furthermore, it is supposed that the number of teeth of the gear $G_1$ is $Z_1$ and the number of teeth of the gear $G_4$ is $Z_4$ in order to obtain the abovementioned moving speed of the optical system. Hereinafter, the relationship between the numbers of teeth of the other gears will be explained on the basis of the number of teeth $Z_1$ of the gear $G_1$ and the number of teeth $Z_4$ of the gear $G_4$. There is the following relationship between the rotating speed $N_{F1}$ of the pulley 17, $Z_1$ and $Z_4$:

$$N_{F1}=(Z_1/Z_4)n$$

(2) When the clutch $CL_2$ is actuated (FIG. 6): This is a case where the exposure scanning is performed in order to obtain a reduced image with a $1/1.5$ area ratio ($m=1/\sqrt{1.5}$) and the optical system is moved at the speed of $v_F=\sqrt{1.5}\ V_F$ at the exposure step, which is obtained by substituting $m=1/\sqrt{1.5}$ in Equation (1). With respect to the transmission path of the driving force, the shaft $J_2$ is rotated by the chain 16 through the sprocket $P_2$ and since the clutch $CL_2$ is actuated, the gear $G_2$ is rotated and the gear $G_4$ which is engaged with the gear $G_2$ is also rotated, whereby the pulley 17 is rotated. At this moment, the wire 18 is rotated counterclockwise. In this case, unless the rotating speed of the pulley 17 is $N_{F2}=\sqrt{1.5}\ N_{F1}$, the moving speed of the optical system $v_F=\sqrt{1.5}\ V_F$ cannot be obtained. Furthermore, $N_{F2}=(Z_2/Z_1)$ n and the number of teeth of the gear $G_2$ is set to be equal to $\sqrt{1.5}\ Z_1$.

(3) When the clutch $CL_3$ is actuated (FIG. 6): This is a case where the exposure scanning is performed in order to obtain a reduced image with a $\frac{1}{2}$ area ratio ($m=1/\sqrt{2}$) and the optical system is moved at the speed of $v_F=\sqrt{2}\ V_F$ at the exposure step, which is obtained by substituting $m=1/\sqrt{2}$ in Equation (1). With respect to the transmission path of the driving force, the shaft $J_3$ is rotated by the chain 16 through the sprocket $P_3$. Since the clutch $CL_3$ is actuated, the gear $G_3$ is rotated and the gear $G_4$ which is engaged with the gear $G_3$ is also rotated, whereby the pulley 17 rotated. At this moment, the wire 18 is rotated counterclockwise. In this case, unless the rotating speed of the pulley 17 is $N_{F3}=\sqrt{2}\ N_{F1}$, the moving speed of the optical system of $v_F=\sqrt{2}\ V_F$ cannot be obtained. Furthermore, $N_F=(Z_3/Z_4)n$ and the number of teeth $Z_3$ of the gear $G_3$ is set to be equal to $\sqrt{2}\ Z_1$.

(4) When the clutch $CL_5$ is actuated (FIG. 7): This is a case where the speed change of the driving force is performed for returning the optical system after completion of the exposure scanning in order to obtain image with unit magnification. With respect to the transmission path of the driving force, the shaft $J_1$ is rotated by the chain 16 through the sprocket $P_1$. Since the clutch $CL_2$ is actuated, the gear $G_5$ is rotated and the idle gear $G_9$ which is engaged with the $G_5$ is also rotated, and the gear $G_8$ which is engaged with the idle gear $G_9$ is rotated, whereby the pulley 17 is rotated. At this moment, the wire 18 is rotated clockwise. Furthermore, the moving speed $v_B$ (mm/sec) of the optical system has to be equal to the value indicated by Equation (5). Supposing that the rotating speed of the pulley 17 which gives the rotating speed $v_B$ (mm/sec) of the optical system is $N_{B1}$ r.p.m., the following equation has to hold good in combination with that at unit magnification, taking into consideration the case in which the clutch $CL_1$ is actuated:

$$N_{B1}/N_{F1} = v_B/v_F \qquad (6)$$

On the other hand, supposing that the number of teeth of the gear $G_5$ is $Z_5$ and that the number of teeth of the gear $G_8$ is $Z_8$, since $N_{B1}=(Z_5/Z_8)n$ and $N_{F1}=(Z_1/Z_4)n$, where n is the number of revolutions per minute of the shafts $J_1$, $J_2$, $J_3$ and that $v_F=V_F$ and $$v_B = \frac{L}{K - \frac{L}{V_F}}$$

(where $m=1$) from Equation (5), the following equation can be obtained by substituting the above in Equation (6):

$$\frac{Z_5}{Z_8} = \frac{Z_1}{Z_4} \times \frac{L}{K - \frac{L}{V_F}} \times \frac{1}{V_F} \qquad (7)$$

In Equation (7), since the number of teeth $Z_1$ and $Z_4$ are known, the numbers of teeth $Z_5$ and $Z_8$ can be also set.

(5) When the clutch $CL_6$ is actuated (FIG. 7): This is a case in which the speed change of the driving force for returning the optical system after completion of the exposure scanning in order to obtain a reduced image with a 1/1.5 area ratio. With respect to the transmission path of the driving force, the shaft $J_2$ is rotated by the chain 16 through the sprocket $P_2$. Since the clutch $CL_6$ is actuated, the gear $G_6$ is rotated and an idle gear $G_{11}$ which is engaged with the gear $G_6$ is rotated and the gear $G_8$ which is engaged with the idle gear $G_{11}$ is also rotated, whereby the pulley 17 is rotated. At this moment, the moving speed $v_B$ (mm/sec) of the optical system has to be equal to the value indicated by Equation (5). Supposing that the rotating speed of the pulley 17 which gives the rotating speed $v_B$ (mm/sec) to the optical system is $N_{B2}$ r.p.m., the following equation has to hold good in combination with that at the magnification of $m=1/\sqrt{1.5}$, considering the case in which the clutch $CL_2$ is actuated:

$$\frac{N_{B2}}{N_{F2}} = \frac{v_B}{v_F} \qquad (8)$$

On the other hand, supposing that the number of teeth of the gear $G_6$ is $Z_6$, $N_{B2}=(Z_6/Z_8)n$ and $N_{F2}=(Z_2/Z_4)n$ (where $Z_2=\sqrt{1.5}\, Z_1$) and that $v_F=\sqrt{1.5}V_F$ and $$v_B = \frac{L}{K - \frac{1}{\sqrt{1.5}} \cdot \frac{1}{V_F}}$$

from Equation (5), the following equation can be obtained by substituting the above in in Equation (8):

$$\frac{Z_6}{Z_8} = \frac{Z_1}{Z_4} \times \frac{L}{K - \frac{1}{\sqrt{1.5}} \cdot \frac{L}{V_F}} \times \frac{1}{V_F} \qquad (9)$$

In Equation (9), the number of teeth $Z_1$ and $Z_4$ are known, the numbers of teeth $Z_6$ and $Z_8$ can also be set.

(6) When the clutch $CL_7$ is actuated (FIG. 7): This is a case in which the speed change of the driving force for returning the optical system after completion of the exposure scanning is performed in order to obtain a reduced image with a 1/2 area ratio. With respect to the transmission path of the driving force, the shaft $J_3$ is rotated by the chain 16 through the sprocket $P_3$. Since the clutch $CL_7$ is actuated, the gear $G_7$ is rotated and an idle gear $G_{10}$ which is engaged with the gear $G_7$ is also rotated and the gear $G_8$ which is engaged with the gear $G_{10}$ is rotated, whereby the pulley 17 is rotated. At this moment, the moving speed $v_B$ (mm/sec) of the optical system has to be equal to the value indicated by Equation (5). Supposing that the rotating speed of the pulley 17 which gives the rotating speed $v_B$ (mm/sec) to the optical system is $N_{B3}$ r.p.m., the following equation has to hold good in combination with that at the magnification of $m=1/\sqrt{2}$, considering the case in which the clutch $CL_3$ is actuated:

$$\frac{N_{B3}}{N_{F3}} = \frac{v_B}{v_F} \qquad (10)$$

On the other hand, supposing that the number of teeth of the gear $G_7$ is $Z_7$, $N_{B3}=(Z_7/Z_8)n$ and $N_{F3}=(Z_3/Z_4)n$ (where $Z_3=\sqrt{2}Z_1$) and that $v_F=\sqrt{2}V_F$ and $$v_B = \frac{L}{K - \frac{1}{\sqrt{2}} \cdot \frac{L}{V_F}}$$

from Equation (5), the following equation can be obtained by substituting the above in Equation (10):

$$\frac{Z_7}{Z_8} = \frac{Z_1}{Z_4} \times \frac{L}{K - \frac{1}{\sqrt{2}} \cdot \frac{L}{V_F}} \times \frac{1}{V_F} \qquad (11)$$

In Equation (11), the numbers of teeth $Z_1$ and $Z_4$ are known, the numbers of teeth $Z_7$ and $Z_8$ can also be set.

In the above-mentioned speed changing mechanism, the number of teeth of each of the sprockets $P_1$, $P_2$ and $P_3$ is supposed to be equal. However, by changing the number of teeth of each of the sprockets $P_1$, $P_2$, $P_3$, a desired speed change ratio can be obtained. Furthermore, when the optical system is returned to its home position, image formation is performed. Therefore, it is not always necessary to set the returning speed accurately. In other words, it is practically sufficient to set the returning speed so as to satisfy approximately each of the above-mentioned equations.

What is claimed is:

1. In a scanning method applicable to variable magnification copying machines capable of performing slit exposure of the image of original document to the surface of a photoconductor with a desired magnification by moving a contact glass on which said original document is placed or an optical system in synchronization with said photoconductor which is moved at a predetermined constant speed, the improvement in which the moving speed of said optical system or of said contact glass at the exposure step and the moving speed of the same at the returning step to the original position thereof are made variable depending upon a selected magnification of the copy of said original document and the moving speed of said optical system or of said contact glass is set in such a manner that the sum of the time required for said optical system or said contact glass to move for exposure scanning and the time required for said optical system or said contact glass to return to the home position thereof is constant regardless of said selected magnification of the copy of said original document.

2. A scanning method applicable to variable magnification copying machines as in claim 1, in which the moving speed of said optical system or of said contact glass is set so as to satisfy the equation of $$v_B = \frac{L}{K - \frac{mL}{V_F}} \quad \left( K = \frac{60}{N} - \delta T \right)$$

wherein L is the distance of one way for said optical system or said contact glass to move for exposure scanning and m is said selected magnification of the copy of said original document and N is the number of copies to be made per minute and $\delta T$ is the time loss (sec) which is regularly caused in each scanning and $V_F$ is said moving speed (mm/sec) of said photoconductor and said optical system or said contact glass at the exposure step with unit magnification and $v_B$ is the moving speed (mm/sec) of said optical system or of said contact glass at the returning step thereof to the home positions thereof.

3. In a variable magnification copying machine capable of performing slit exposure of image of original document to the surface of a photoconductor with a desired magnification by moving a contact glass on which said original document is placed or an optical system in synchronization with said photoconductor which is moved at a predetermined constant speed, a scanning apparatus having speed changing mechanism capable of moving said optical system or said contact glass at speeds which satisfy the equation of $$v_B = \frac{L}{K - \frac{mL}{V_F}} \quad \left( K = \frac{60}{N} - \delta T \right)$$

wherein L is the distance of one way for said optical system or said contact glass to move for exposure scanning, and m is said selected magnification of the copy of said original document, and N is the number of copies to be made per minute, and $\delta T$ is the time loss (sec) which is regularly caused in each scanning, and $V_F$ is said moving speed (mm/sec) of said photoconductor and said optical system or said contact glass at the exposure step with unit magnification, and $v_B$ is the moving speed (mm/sec) of said optical system or of said contact glass at the returning step thereof to the home position thereof.

4. A scanning apparatus as in claim 3, in which said speed changing mechanism comprises a combined mechanism of gears and clutches capable of transmitting rotating force input to an input section of said mechanism to said optical system or to an output section for driving said contact glass with a predetermined speed changing ratio and in a predetermined rotating direction.

* * * * *